United States Patent [19]

Plotto et al.

[11] Patent Number: 4,473,855

[45] Date of Patent: Sep. 25, 1984

[54] MAGNETIC TRANSDUCER PLATFORMS WITH PROTECTIVE FAIRING

[75] Inventors: Michel Plotto, Plaisir; Jean-Claude Teucilide, Villiers-Saint-Frederic, both of France

[73] Assignee: Compagnie Internationale pour l'Informatique Cii-Honeywell Bull, Paris, France

[21] Appl. No.: 462,433

[22] Filed: Jan. 31, 1983

Related U.S. Application Data

[63] Continuation of Ser. No. 197,340, Oct. 15, 1980, abandoned.

[30] Foreign Application Priority Data

Jan. 31, 1980 [FR] France .................................. 80 02144

[51] Int. Cl.³ ......................... G11B 5/48; G11B 21/20
[52] U.S. Cl. ................................. 360/104; 360/103; 360/75
[58] Field of Search ................................. 360/102–105, 360/97–99

[56] References Cited

U.S. PATENT DOCUMENTS

| | | | |
|---|---|---|---|
| 3,612,775 | 10/1971 | Miller | 360/103 |
| 4,120,010 | 10/1978 | Mitsuta et al. | 360/103 |
| 4,189,759 | 2/1980 | Bauck et al. | 360/104 |
| 4,268,879 | 5/1981 | Watrous | 360/103 X |

OTHER PUBLICATIONS

IBM/TDB, vol. 9, No. 12, May 1967, p. 1746, "Flying Head Loading Control", by Schnerseli.

Primary Examiner—John H. Wolff
Attorney, Agent, or Firm—Kerkam, Stowell, Kondracki & Clarke

[57] ABSTRACT

Platform comprising a principal member containing a read and/or record transducer for a data carrier and a suspension device connected on the one hand to the said principal member and on the other hand to means of supporting the platform.

In accordance with the invention, the platform is characterized in that is comprises means for modifying the flow of air around all or part of the principal member and of the suspension device. A protective fairing of walls envelope the principal member to minimize turbulent effects on the transducer.

11 Claims, 9 Drawing Figures

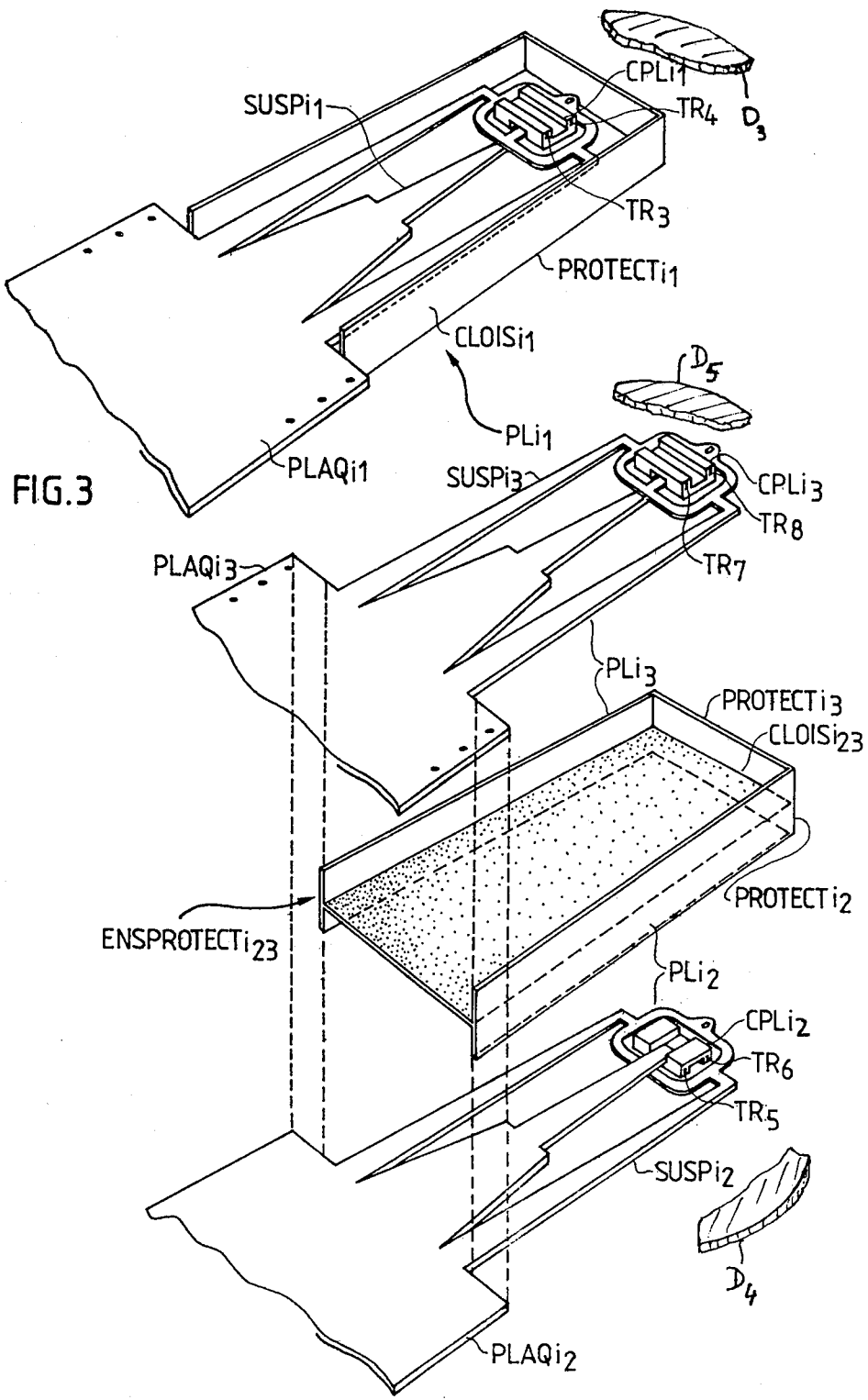

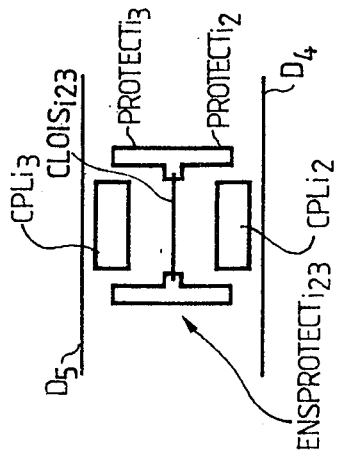
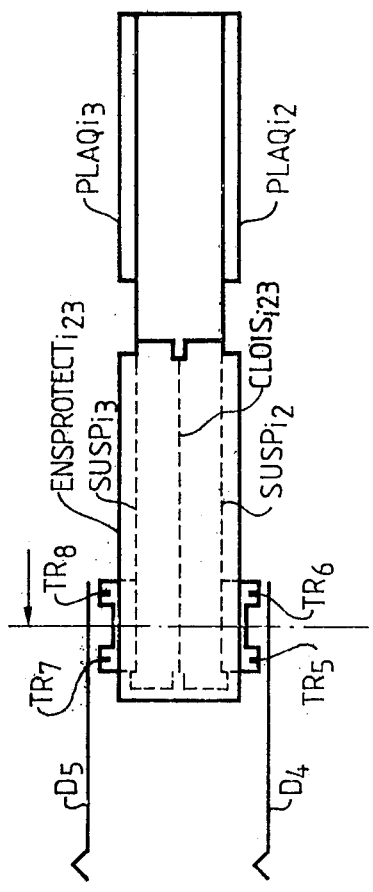
FIG.5a
FIG.5b
FIG.5

MAGNETIC TRANSDUCER PLATFORMS WITH PROTECTIVE FAIRING

This is a continuation, of application Ser. No. 197,340, filed Oct. 15, 1980 now abandoned.

BACKGROUND OF THE INVENTION

1. Field of the Invention

The present invention relates to a platform, i.e., a supporting structure, containing at least one transducer for reading from and/or writing on a data carrier. It is applicable in particular to the magnetic peripherals of data processing systems, such as disc memories.

2. Description of the Prior Art

In data processing systems, the application of magnetic disc memories is becoming increasingly frequent because of their storage capacity and of the relatively short access time. Access time is the period taken by a read and/or write transducer to gain access to data contained at a particular point on the discs from the instant in which the transducers receive the order from the said processing system to gain access to this data.

Magnetic discs conventionally carry data on circular and concentric recording tracks which have a radial width not exceeding several hundredths of a millimeter, and covering the major part of their two surfaces. If a memory of this kind comprises several discs, the discs are parallel, co-axial and most frequently of the sare diameter. Whether the memory comprises several discs or one only, the disc(s) is driven at a constant speed of revolution by an electric motor.

In current practice, each surface of a disc commonly has associated with it a single transducer. To make an appreciable reduction in the time spent to gain access to any data item contained on this surface, the latter may have associated with it several transducers, of which the number does not exceed one or two tens of units and remains considerably smaller than the number of tracks. In the remainder of the description, the term "disc surface" shall imply the association of the surface with one or more transducers.

The transducers associated with one surface of a disc are generally carried by one and the same principal member installed as part of a platform which also comprises a suspension device secured to this principal member. By extension, it is said that the principal member (and equally the platform) is associated with the said surface.

There are two conventional types of platforms, namely:

(1) platforms of the movable kind which are displaced radially above the disc surface associated with them. Radial orientation of the platform enables the transducer(s) carried by their (its) principal member to be positioned so as to be able to gain access to any information contained on the associated surface. In this case, the suspension device of the platform is installed on a carriage or slide which is displaced at the outside of the discs.

(2) platforms of the stationary kind which, during the read and/or record operations, remain permanently still above defined tracks on the disc surface with which the transducers of their principal member are associated, each of these remaining associated in time with one and the same track. In this case the platform suspension device is secured to the framework of the disc memory.

It is apparent that notwithstanding its nature of the platform, (stationary or movable) the platform is secured via its suspension device to supporting means which is a carriage for a platform of the movable kind, and a framework of the disc memory for a platform of the stationary kind. The platforms most frequently utilized in current practice, are of the movable kind.

Most often, the transducers form a magnetic circuit around which is arranged a winding, and which comprises an air gap. This winding is connected by electrical input and/or output conductors to the electronic read and/or record circuits of the disc memory which comprises the transducers.

The variation of the magnetic induction within the air gap of each transducer allows of reading and/or recording (writing) data on the surface of the disc associated with it. Because of this, the air gap consequently constitutes the transducer device for picking up (reading) and/or recording (writing) data.

As a rule, but not exclusively, the principal member of a platform has the form of a comparatively flat right angle parallelepiped of which a first "large surface" positioned opposite the surface of the disc contains the air gap or gaps of the transducer(s), the second "large surface" extending substantially parallel to the first, containing the ends of the input and/or output conductors attached to the transducer(s).

During the rotation of the disc, a cushion of compressed air is formed between the disc and the first "large surface" of the principal member, which prevents this member touching and consequently damaging the disc. It is then said that the principal member flies above the disc.

The distance between the air gap(s) of the transducer(s) and the disc surface is referred to as "flight altitude" or else "flying leight" of the principal member. It is usually of the order of several tens of microns. The air cushion exerts a pressure on all or part of the first "large surface" of the principal member at right angles to the same and directed towards its second large surface". The part of the "first large surface" which is exposed to the pressure of the air cushion is referred to as "flying surface". The resulting force is referred to as "lift of the principal member" which is a function of the flying surface.

The dynamic balance of the principal member in flight is obtained by opposing to the lift an equal and opposite force referred to as "loading force" which is commonly applied to the "second large surface".

Platforms known under the name of "Winchester" platforms are utilized ever more frequently in current practice. Platforms of this nature are produced in particular by the company "Applied Magnetic Corporation" (A.M.C.) under reference numbers 3304 and 3305.

A platform of the "Winchester" type is produced in the following manner.

One or more chemicals (which are often referred to as grooves) are formed on the lower surface of its principal member, their depth being greater than or equal to 30 microns, and being able to reach up to several tenths of a millimeter. The result thereof on this surface is the presence of several projecting parts which are referred to as skids. In common practice the skids are ski-shaped.

The surface of the skids opposite the surface of the disc forms the flying surface. The lift being proportional to this surface, it is apparent that the grooves made in the lower surface of the principal member make is possible to reduce the lift and consequently the loading force by reducing the flying surface (as compared to a principal member lacking grooves). Said loading force is provided, for example, by a preloaded spring associated with the platform suspension device. (In particular cases in current practice, the said spring forms all or part of the suspension device itself).

This loading force is comparatively small and of the order of ten to twenty grammes. Because of this, it is said that the "Winchester" type of platform is a low-load platform.

As a rule, flight of a principal platform member of the "Winchester" type above the surface of the disc associated with it, occurs in such manner that the surface of the skid is generally sloping with respect to the surface of the disc. This endows said skids with sufficient lift for the flight of the principal member to be comparatively stable.

The low-load platforms of the "Winchester" type which consequently have low flight altitude, make it possible:

(1) on the one hand, thanks to this low flight altitude, to obtain read signals delivered by its (their) transducer(s) which are of relatively great amplitude, which allows of satisfactory reading reliability, (2) on the other hand, thanks to their low load, to prevent the principal member of the platform from striking the disc and consequently damaging this latter as well as the said principal member.

However, in view of the low loading force, these platforms have certain disadvantages. For example, the probability that the flight of their principal member above the disc surface associated with it is comparatively unstable, cannot be disregarded. Further, the principal member of the suspension device is exposed to other forces than the loading force such as "parasitic forces". These parasitic forces are caused, for example, by:

(1) vibrations generated by different elements of the disc memory, such as the disc driving motor, or the motor, or the motor for driving the carriage which carries the device for suspension of the platform;

(2) inherent oscillatory displacements of the principal member around a median position which causes the same to move away from or towards the dics; and (3) air turbulence close to the surface of the disc associated with the transducer of the principal member of the platform.

If the disc memory comprises several discs, this turbulence is particularly large in the space present between two discs. The resultant forces act essentially on the suspension device. The forces caused by the turbulence are counted among the most substantial of the parasitic forces.

It can be readily appreciated that these parasitic forces cause the flying height of the principal member to vary appreciably which causes very appreciable variations in the amplitude of the read signals, which for their part may lead to faults in determing the value of the data recorded on the discs. It is of importance, therefore, to reduce the magnitude of the said force, either by suppressing all or part of these, or by restricting their effect.

In current practice, the parasitic forces caused by inherent vibrations of the principal member of the platform are reduced by placing its suspension device as close as possible to the disc surface with which the principal member is associated.

To this end, the suspension device is secured within a groove in the principal member, the groove for example being formed in the "second large surface" containing the extremities of the input and/or output conductors of the transducers of this member. The suspension device may equally be secured within a groove formed in the "first large surface" situated opposite the surface of the disc associated with the transducer of the principal member. This last solution is described in greater detail in the French patent application Ser. No. 78 15765 filed May 26th 1978, entitled "Platform Having At Least One Transducer For Reading From And/Or Writing On A Data Carrier", and corresponding U.S. application Ser. No. 37,725, filed May 16, 1979 now U.S. Pat. No. 4,261,024, both of which are assigned to the assignee of the present invention.

SUMMARY OF THE INVENTION

In accordance with the present invention, in order to eliminate the parasitic forces caused by the air turbulence, the platform is provided with a substantially U-shaped framework or protective fairing device which envelopes the principal member and all or part of the suspension device, so modifying the flow of air around these. This makes it possible to limit or even cancel the actions of the turbulent layers on the flying height of the principal member.

In accordance with the invention, the platform containing at least one transducer for reading from and/or writing on a data carrier, which comprises a principal member containing the said transducer and a suspension device connected on the one hand to the said member and on the other hand to platform supporting means, the "first large surface" of the principal member containing the means for reading and/or recording data is characterized in that is comprises means for modifying the air flow around all or part of the principal member and of the suspension device.

BRIEF DESCRIPTION OF THE DRAWINGS

Other features and advantages of the device of the invention will appear by way of non-limiting example and with reference to the accompanying drawings:

FIG. 1 illustrates a platform in accordance with the prior art, comprising at least one transducer of which the principal member is illustrated in flight above a magnetic disc D and comprises FIGS. 1a–1d.

FIG. 3 shows a first embodiment of a platform in accordance with the invention, of which the principal member comprises two transducers, the platform being shown in flight opposite a disc $D_3$;

FIG. 4 is an exploded three-quarter perspective view, showing two platforms according to the invention positioned opposite the two discs $D_4$ and $D_5$ and within the space present between these two discs, their protective fairing devices having a common partition;

FIG. 5 is a set of two FIGS. 5a and 5b showing the platform of FIG. 4 as seen from the rear and side in the form of simplified sketchas.

DESCRIPTION OF THE PREFERRED EMBODIMENTS

For a better understanding of the structural and operational principles of the platform comprising at least one transducer in accordance with the invention, it is useful to recall a number of features illustrated by FIG. 1 showing a platform $PL_a$ in accordance with the prior art.

Figure 1A:
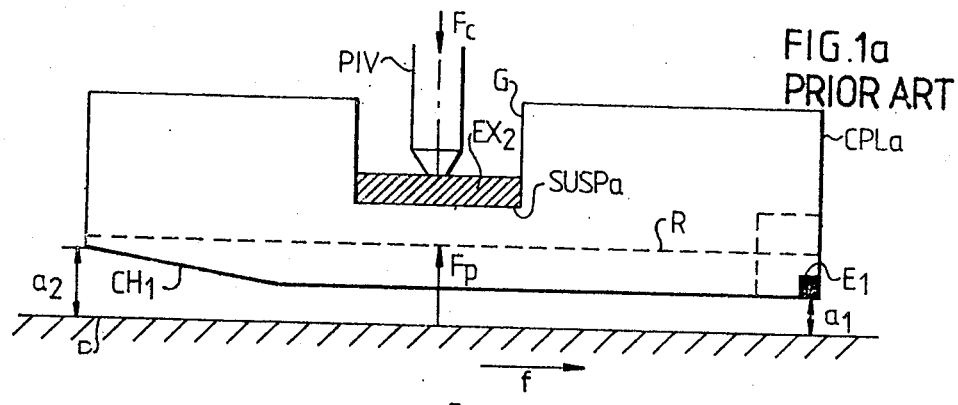
FIG. 1a being a sideview.
Figure 1B:
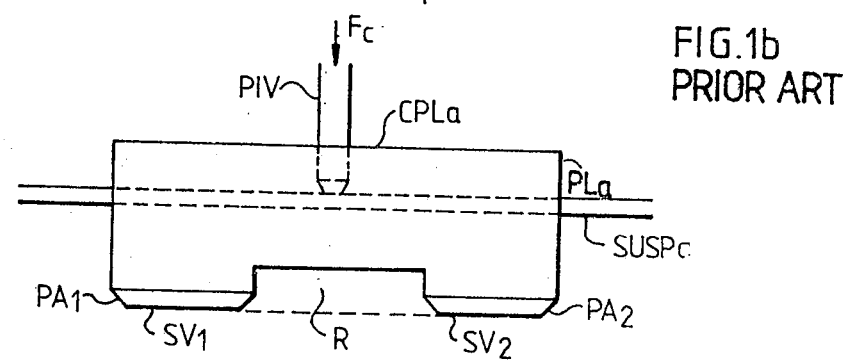
FIG. 1b being a front view.
Figure 1C:
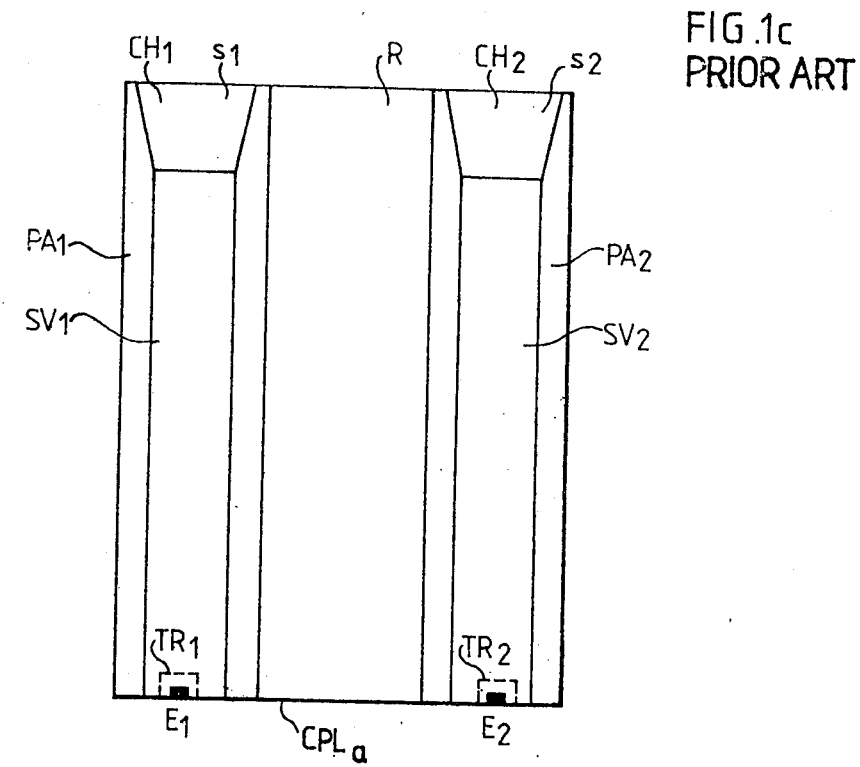
FIG. 1c being a view from below.

Initially considering the side view of FIG. 1a, the front view of FIG. 1b and the bottom view of FIG. 1c, this platform comprises:

(1) on the one hand, a principal member $CPL_a$ of substantially parallelepiped shape, illustrated in the form of a catamaran comprising two skids $PA_1$ and $PA_2$ between which is situated a groove R; and (2) on the other hand, a suspension device $SUSP_a$.

Each of the two skids $PA_1$ and $PA_2$ comprises a transducer, the skid $PA_1$ comprising the transducer $TR_1$ and the skid $PA_2$ comprising the transducer $TR_2$. The transducers $TR_1$ and $TR_2$ have the corresponding read and-/or record air gaps $E_1$ and $E_2$. The two skids comprise, respectively, on the one hand a principal flying surface $SV_1$ and a chamfer $CH_1$ having a sloped surface $s_1$, and on the other hand a principal flying surface $SV_2$ and a chamfer $CH_2$ having a sloped surface $s_2$. The flying surface of the skid $PA_1$ is equal to $SV_1+s_1$ and the flying surface of the skid $PA_2$ is equal to $SV_2+s_2$. The total flying surface of the principal member $CPL_a$ of the platform $PL_a$ is thus equal to $SV=SV_1+s_1+SV_2+s_2$.

As is apparent from FIG. 1a, wherein is shown the principal member $CPL_a$ of the platform in flight above the magnetic disc D which travels past at a constant speed in the direction of the arrow f, the platform inclines slightly with respect to the disc surface in such a manner that the air gaps $E_1$ and $E_2$ are situated at a flight altitude $a_1$ above the disc D which is smaller than the flight altitude $a_2$ of the chamfer $CH_1$ and of the chamfer $CH_2$. The two flight surfaces $SV_1$ and $SV_2$ define a plane which intersects at an angle (not shown) with the disc surface. This angle is very small and of the order of a few milliradians. If a point P of the disc D is considered, it is apparent that the latter passes successively adjacent to the chamfer $CH_1$ and, then, adjacent to the air gaps $E_1$ and $E_2$. It is then said that the chamfers $CH_1$ and $CH_2$ are situated to the front of the flying surface of the principal member $CPL_a$ and that the air gaps are situated to the rear of the flying surface.

One of the extremities $EX_1$ of the susepnsion device $SUSP_a$ is secured by any appropriate means to platform carrying means which, when the lattar is movable, are formed by a carriage which makes it possible to displace the platform radially with respect to the tracks of the magnetic disc D (the carriage is not illustrated in FIG. 1 in order to simplify matters).

Figure 1D:
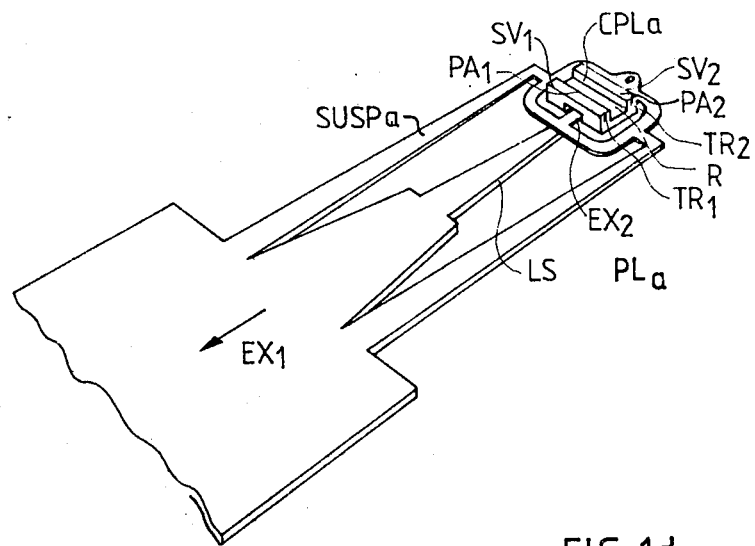
FIG. 1d being a three-quarter perspective view, showing the suspension device and the first large surface of the principal member.

As best shown in FIG. 1d, the other extremity $EX_2$ of the suspension device $SUSP_a$ is secured to the principal member $CPL_a$, within a groove or channel R, for example formed in the upper surface of the same.

When the member $CPL_a$ flies above the disc D, an air cushion is formed between the flying surface SV and the disc surface, which exerts a thrust force $F_p$ on the principal member ($F_p$ is the lift) which is proportional to the flying surface and equal to $k \times SV$ (k being a proportionality factor).

To establish dynamic blance of the principal member of the platform in flight above the disc D, a force $F_c$ is applied on the second "large surface" of the same, for example by means of a pivot P. This force $F_c$ which is the loading force, or else the load, is of the order of ten to twenty grams and is provided by the blade LS illustrated in FIG. 1d, which blade acts as a spring.

Under these conditions, the transducers $TR_1$ and $TR_2$ then have a flight altitude $a_1$ substantially equal to 0.4 to 0.5 microns.

Figure 2:
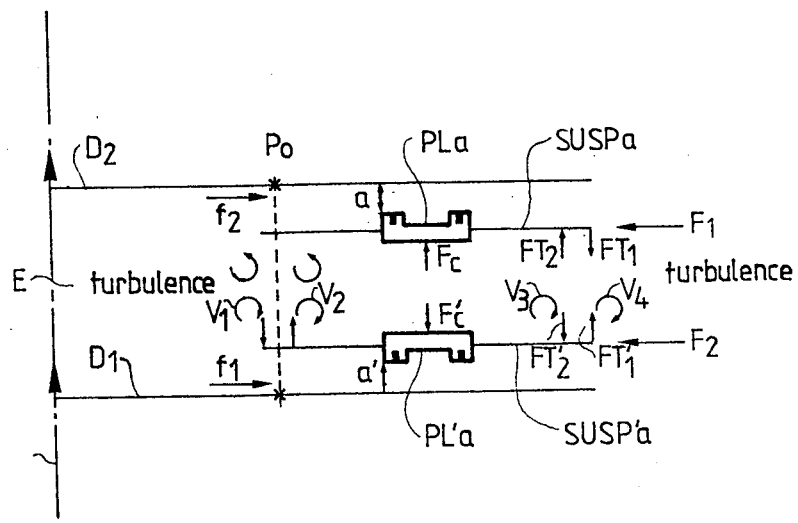
FIG. 2 shows how the turbulence act on two prior art platforms, when they are situated in a space present between two discs $D_1$ and $D_2$.

Considering now FIG. 2, this illustrates two prior art platforms namely $PL_a$ and $PL'_a$ in flight above the surfaces of two discs $D_1$ and $D_2$ of a disc memory comprising a plurality of discs (the other discs not being illustrated to simplify matters). These platforms are located within the space E situated between the two discs $D_1$ and $D_2$.

In current practice, for the purpose of eliminating dust and all other kinds of impurities found in the space E, the disc memory comprises a ventilation system (not shown in FIG. 2 to simplify matters), which causes air to circulate along the surface of the two discs $D_1$ and $D_2$, latter up to their peripheries. This air, which will be referred to as "ventilated air" flows tangentially to the surface of the discs in the directions denoted by the arrows $f_1$ and $f_2$.

Because of the rotation of the discs, the ventilated air tends to be drawn along in the direction of this rotation, tangentially to the circular tracks of the disc. Its speed close to one of the tracks (that is to say at a distance of several microns) which is equal to the linear tangential speed of any point of the track in question is greater close to a track at the periphery than close to a track nearer to the center. Conversely, the pressure of the ventilated air is lower close to the periphery than close to the center.

The following consequences result: for any point situated between a track having a particular serial number $P_O$ and a track at the periphery of the disc, the pressure of the air outside the space E situated between the discs $D_1$ and $D_2$, which pressure is equal for example, to atmospheric pressure. This has the result that a part of the external air penetrates into the space E, which is denoted in FIG. 2 by the arrow $F_1$ and $F_2$. The encounter between the ventilated air flowing in accordance with the arrows $f_1$ and $f_2$ and the external air flowing in accordance with the arrows $F_1$ and $F_2$ gives rise to turbulence or turbulence layers $V_1$, $V_2$, $V_3$, $V_4$, etc... These turbulence layers or turbulence act on the platforms $PL_a$ and $PL'_a$ in the following manner: whether the platform $PL_a$ (or $PL'_a$) be exposed to very small displacements (smaller than the width of a track) or to more substantial displacements, it is exposed successively to forces $FT_1$, $FT_2$, ($FT'_1$, $FT'_2$) which are producing turbulence, as shown in FIG. 2. This causes variations either in the flight altitude $a(a')$ of the tranducers $TR_1$ and $TR_2$ ($TR'_1$ and $TR'_2$) of the platform $PL_a$ ($PL'_a$), or vibrations of the suspension device $SUSP_a$($SUSP'_a$) which equally cause variation of the said flight altitude. This leads to appreciable variations of the amplitude of the signals delivered by each of the transducers $TR_1$ and $TR_2$ ($TR'_1$ and $TR'_2$). Thus, if the signal delivered by each of the transducers $TR_1$ and $TR_2$ has a mean amplitude equal to $U_m$ for a mean flight altitude $a_m$, the amplitude of the signals delivered varies in practice between two values $U_{min}$ and $U_{max}$ which are equal, respectively, to $(U_m-50\% \ U_m)$ and $(U_m+50\% \ U_m)$.

In order to reduce the risk of errors in establishing the value of the data corresponding to each of these signals, it is thus necessary to reduce or even eliminate either the said turbulence layers or their effects at the level of the principal member as well as of the suspension device of these platforms.

The platform in accordance with the invention, illustrated in FIGS. 3, 4 and 5, makes it possible to obtain the desired result. As is apparent from FIG. 3, the platform $PL_{i1}$ which is a first embodiment of the invention, comprises a protective fairing device $PROTECT_{i1}$ which surrounds the suspension device $SUSP_{i1}$ and the principal member $CPL_{i1}$ except for parts of these which are opposite the disc $D_3$ associated with the transducers $TR_3$ and $TR_4$ of the principal member $CPL_{i1}$. As apparent from the lower part of FIG. 3, the protective device $PROTECT_{i1}$ comprises a wall $CLOIS_{i1}$ situated at the side of the second "large surface" of the principal member $CPL_{i1}$ and which has a surface substantially perpendicular to the surface of the disc $D_3$. The device $PROTECT_{i1}$ is fastened by appropriate means, for example by rivoting or by welding, to a plate $PLAQ_{i1}$ secured by means which are not shown to the carriage which carries the said platform $PL_{i1}$.

Referring to FIG. 4, which illustrates a preferred embodiment of two platforms or magnetic transducer supporting structures; $PL_{i2}$ and $PL_{i3}$ constructed in accordance with the present invention, which associate with two discs $D_4$ and $D_5$, respectively. The platform $PL_{i2}$ comprises a principal member $CPL_{i2}$ containing two transducers $TR_5$ and $TR_6$. The platform $PL_{i3}$ comprises a principal member $CPL_{i3}$ containing the two transducers $TR_7$ and $TR_8$. The suspension devices $SUSP_{i2}$ and $SUSP_{i3}$ of the platforms $PL_{i2}$ and $PL_{i3}$ are identical to the suspension device $SUSP_{i1}$ of the platform $PL_{i1}$ in accordance with the invention illustrated in FIG. 3, which suspension device itself is identical to the device $SUSP_a$ of the platform $PL_a$. The suspension devices $SUSP_{i2}$ and $SUSP_{i3}$ are integral, respectively with the plates $PLAQ_{i2}$ and $PLAQ_{i3}$ which are themselves attached to the same carriage which supports the said platforms $PL_{i2}$ and $PL_{i3}$. The device for protection of the platform $PL_{i2}$ is referred $PROTECT_{i2}$, whereas that for the platform $PL_{i3}$ is referenced $PROTECT_{i3}$. These two protective devices comprise substantially U-shaped frameworks which; have a common partition or center wall $CLOIS_{i23}$ and which envelope three sides of the platforms remote from the data surfaces, as best shown, for example, in FIG. 5a. As apparent more clearly from FIG. 4, the protective fairing devices $PROTECT_{i2}$ and $PROTECT_{i3}$ form a one-piece protective combination $ENSPROTECT_{i23}$. The lower part (see FIG. 4) of this protective combination which relates to the protective device $PROTECT_{i2}$ is fastened by appropriate means (for example by rivoting or by welding) to the plate $PLAQ_{i2}$, whereas the upper part of the said combination which relates to the protective device $PROTECT_{i3}$ is secured by appropriate means identical to the former to the plate $PLAQ_{i3}$.

Experience demonstrates, with the platform $PL_{i1}$ as well as with the platforms $PL_{i2}$ and $PL_{i3}$, that the actions of the turbulence or turbulent layers on the amplitude variations of the signals delivered by the transducers of the said platforms are much weaker than for the platforms in accordance with the prior art. As a matter of fact, the air coming from the outside passes above or over the different protective devices $PROTECT_1$ and $ENSPROTECT_{i23}$ without passing through the immediate surroundings of the different principal members (and consequently of the transducers) $CPL_{i1}$, $CPL_{i2}$ and $CPL_{i3}$, as well as of the suspension devices $SUSP_{i1}$, $SUSP_{i2}$ and $SUSP_{i3}$. $PROTECT_{i1}$ and $ENSPROTECT_{i23}$ thus shield against turbulence by blocking airflow parallel to the data surfaces of discs $D_3$, $D_4$ and $D_5$. It is then shown that the amplitude variations of these signals around the means value $U_m$ are on the order of approximately 10 to 15% of the same. It may thus be stated that the protective device $PROTECT_{i1}$ of the platform $PL_{i1}$ as well as the protective devices $PROTECT_{i2}$ and $PROTEDT_{i3}$ of the platforms $PL_{i2}$ and $PL_{i3}$ constitute means for modifying the flow of air around the principal member and the suspension device of the corresponding platforms, in such a manner as to limit or even eliminate the actions of the turbulent layers on the flight conditions of this same principal member opposite the disc with which it is associated. This has the results of reducing the amplitude variations of the signals delivered by the transducers around their mean value.

The protective function of $ENSPROTECT_{i23}$ is further evident from the simplified drawings of FIGS. 5a and 5b showing different view of the platform of FIG. 4. FIG. 5a shows the view from the carriage or rear end of the platform, whereas FIG. 5b shows a side view of the platform. The sidewalls $PROTECT_{i2}$ and $PROTECT_{i3}$ are perpendicular to centerwall $CLOIS_{i23}$ and the data surfaces of discs $D_4$ and $D_5$, as shown.

Although specific embodiments have been disclosed, it is to be understood that these are for illustrative purposes only. Accordingly, the scope of the present invention should be determined with reference to the appended claims.

We claim:

1. Apparatus for supporting a magnetic transducer adjacent to a data surface of a movable data carrier, the apparatus comprising a magnetic transducer supporting structure including a principal member having a surface containing the magnetic transducer, and a suspension device having one end connected to the principal member and another end connected to means for carrying the structure so as to dispose the surface of the principal member opposite the data surface of the data carrier; and means for modifying the flow of air around the principal member and the suspension device comprising a substantially U-shaped framework enveloping substantially three sides of both the principal member and the suspension device, all three sides being remote from the data surface, whereby the resultant air turbulence on the magnetic transducer and its supporting structure is minimized.

2. Apparatus according to claim 1 wherein the transducer is operative to read and/or write data on the data surface of the data carrier when the principal member has an air bearing spacing between its surface and the data surface of a moving data carrier.

3. Apparatus according to claim 1 wherein said first data carrier is a transducer supporting magnetic disc, said structure and said magnetic disc together constituting a disc memory.

4. Apparatus according to claim 1 wherein said U-shaped framework comprises a plurality of walls perpendicular to said data surface and a protective wall parallel to the data surface, said walls shielding said principal member and said suspension device from turbulent air flow.

5. Apparatus according to claim 1 wherein said surface of said principal member includes a plurality of skids and a groove.

6. Apparatus according to claim 1 further including another magnetic transducer supporting structure being disposed on an opposite side of said U-shaped framework from said first-mentioned magnetic transducer supporting structure and comprising:

another principal member having another surface containing another magnetic transducer, and another suspension device connected to the other principal member and to another means for carrying the other magnetic transducer supporting structure so as to dispose said other surface opposite another data surface of another data carrier that is spaced from said first-mentioned data carrier; and wherein another substantially U-shaped framework is formed on said first-mentioned U-shaped framework to envelop substantially three sides of said other principal member and said other suspension device, all three of such sides being remote from said other data surface, whereby the resultant air turbulence on said other magnetic transducer and its supporting structure is minimized.

7. Apparatus according to claim 6, wherein said data surfaces are disposed on first and second magnetic discs, respectively, with the data surfaces being parallel and facing each other with said supporting structures located between the data surfaces, and said U-shaped frameworks shield said principal members and said suspension devices by blocking air flow parallel to said data surfaces.

8. Apparatus according to claim 7 wherein said U-shaped frameworks include walls disposed on opposite sides of said supporting structures and extending perpendicular to said data surfaces.

9. Apparatus according to claim 8 wherein said U-shaped frameworks include a common wall joining said walls on opposite sides so as to separate said principal members and said suspension devices of the respective supporting structures.

10. Apparatus as set forth in claim 9 wherein said common wall extends the length of said suspension members.

11. Apparatus as set forth in claim 9 wherein said walls on three sides extend above and below a plane of the common wall so as to form a protecting enclosure on each side of the common wall for each suspension device and associated principal member.

* * * * *

UNITED STATES PATENT AND TRADEMARK OFFICE
CERTIFICATE OF CORRECTION

PATENT NO. : 4,473,855
DATED : September 25, 1984
INVENTOR(S) : Michel Plotto; Jean-Claude Teucilide It is certified that error appears in the above-identified patent and that said Letters Patent is hereby corrected as shown below:

```
Column 8, Line 56, delete "first";
Column 8, Line 57, before "transducer" insert --
                         magnetic disc, said --;
Column 8, Line 57, after "supporting" delete "magnetic
                         disc,";
Column 8, Line 58, before "structure" delete "said".
```

Signed and Sealed this

Sixteenth Day of July 1985

[SEAL]

Attest:

DONALD J. QUIGG

*Attesting Officer*    *Acting Commissioner of Patents and Trademarks*